UNITED STATES PATENT OFFICE.

RENÉ BOHN AND PAUL NAWIASKY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

GRAY TO BLACK SHADES ON VEGETABLE FIBER AND PROCESS OF PRODUCING THEM.

1,066,987.     Specification of Letters Patent.     Patented July 8, 1913.

No Drawing.     Application filed February 11, 1913. Serial No. 747,779

*To all whom it may concern:*

Be it known that we, RENÉ BOHN and PAUL NAWIASKY, citizens, respectively, of the Swiss Republic and the Austro-Hungarian Empire, residing at Mannheim, Germany, have invented new and useful Improvements in Gray to Black Shades on Vegetable Fiber and Processes of Producing Them, of which the following is a specification.

According to von Georgievics (*Zeitschrift für Farben- u. Textil-Industrie*, 4, 190) the quinizarin-sulfonic acid obtainable by heating quinizarin with fuming sulfuric acid at 140° C. has the property of a mordant coloring matter, but the shades on mordanted wool are not fast against either boiling or carbonizing.

We have now found that we can obtain fast gray to deep black shades on vegetable fiber by printing quinizarin-sulfonic acid with a chromium salt and then steaming. If an inorganic chromium salt be employed, care must be taken that the acid thereof does not attack the fiber, and for this purpose any suitable compound which fixes mineral acid can be employed, such for example as sodium acetate, or the quantity of chromium salt, such for instance as chromium fluorid, must be so chosen that the fiber is practically unattacked. The shades obtained have excellent fastness against the action of washing and light. Any known or available quinizarin-sulfonic acids are suitable for use according to this invention.

Vegetable fiber with fast gray to black shades which have been obtained according to the process of this invention can be recognized by the following properties. It is free from nitrogen, but contains sulfur and chromium and also yields red to violet solutions in concentrated sulfuric acid, which solutions on the addition of boric acid assume a yellow fluoresence.

The following example will serve to illustrate further the nature of our invention, which, however, is not confined to this example. The parts are by weight. Prepare a printing paste from 3.5 parts of the sodium salt of quinizarin-sulfonic acid (obtainable by sulfonating quinizarin), 13.5 parts of water, 7 parts of chromium acetate of 20° Bé., 1 part of formic acid and 25 parts of acetic-acid-starch-tragacanth thickening. Print this paste on the material and steam for 1 hour under a pressure of 0.5 atmosphere. In this way a deep black print is obtained.

The acetic-acid-starch-tragacanth thickening may be made as follows. Boil together, for 1 hour, from 2,500 to 3,000 parts of wheat starch, 5,000 parts of a 6% tragacanth paste, 1,000 parts of glycerin, and 12,000 parts of water, and stir in, while the mass is still warm, 2,000 parts of 30% acetic acid. The tragacanth paste can be prepared by mixing together 600 grams of gum tragacanth with 10 liters of water and allowing the mixture to stand for some time and stirring at intervals. Then boil for from 4 to 6 hours, replacing the water which evaporates off, so that the whole has always a practically constant volume.

In a similar manner, other quinizarin-sulfonic acids can be employed, such for instance as the acid described in the specification of German Patent No. 84,505.

Now what we claim is:—

1. The process of producing fast gray to black shades on vegetable fiber by applying to the fiber a mixture containing a quinizarin-sulfonic acid and a chromium salt, and subjecting the whole to the action of steam.

2. As a new article of manufacture vegetable fiber with fast gray to black shades, which is free from nitrogen, but contains sulfur and chromium and also yields red to violet solutions in concentrated sulfuric acid, which solutions on the addition of boric acid assume a yellow fluorescence.

In testimony whereof we have hereunto set our hands in the presence of two subscribing witnesses.

RENÉ BOHN.
                  PAUL NAWIASKY.

Witnesses:
    J. ALEC. LLOYD,
    JOSEPH TEIFFER.